(12) United States Patent
Harel

(10) Patent No.: US 9,867,081 B1
(45) Date of Patent: Jan. 9, 2018

(54) OPTIMIZING RADIO FREQUENCY (RF) COVERAGE IN REMOTE UNIT COVERAGE AREAS IN A WIRELESS DISTRIBUTION SYSTEM (WDS)

(71) Applicant: Corning Optical Communications Wireless Ltd, Airport (IL)

(72) Inventor: Dror Harel, Hod Hasharon (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 15/455,230

(22) Filed: Mar. 10, 2017

Related U.S. Application Data

(63) Continuation of application No. 15/263,999, filed on Sep. 13, 2016, now Pat. No. 9,642,094.

(51) Int. Cl.
| | | |
|---|---|---|
| *H04H 20/71* | (2008.01) | |
| *H04W 28/06* | (2009.01) | |
| *H04W 52/02* | (2009.01) | |
| *H04W 88/02* | (2009.01) | |
| *H04W 88/08* | (2009.01) | |

(52) U.S. Cl.
CPC ........... *H04W 28/06* (2013.01); *H04W 52/02* (2013.01); *H04W 88/02* (2013.01); *H04W 88/08* (2013.01)

(58) Field of Classification Search
CPC ............. H04W 24/02; H04W 72/0453; H04W 28/16; H04W 8/12; H04W 52/241; H04W 4/06; H04W 52/242
USPC ..... 455/3.01, 3.03, 3.06, 3.05, 422.1, 403.1, 455/445, 500, 517, 507, 508, 509, 515, 455/550.1, 426.1, 426.2, 450, 456.3; 370/338, 310, 311, 252, 329, 328; 1/1
See application file for complete search history.

(56) References Cited

U.S. PATENT DOCUMENTS

| | | | |
|---|---|---|---|
| 2014/0242999 A1* | 8/2014 | Goshen | ................. H04W 40/12 455/445 |
| 2014/0370884 A1 | 12/2014 | Kummetz et al. | |
| 2016/0005063 A1 | 1/2016 | Zimmerman et al. | |

FOREIGN PATENT DOCUMENTS

WO     2014193342 A1    12/2014

* cited by examiner

*Primary Examiner* — Keith Ferguson
(74) *Attorney, Agent, or Firm* — C. Keith Montgomery

(57) ABSTRACT

Embodiments of the disclosure relate to optimizing radio frequency (RF) coverage in remote unit coverage areas in a wireless distribution system (WDS). A control circuit is configured to selectively determine at least one selected remote unit group comprising two or more remote units selected from a plurality of remote units in the WDS. A first remote unit in the selected remote unit group is configured to transmit an RF signal. The control circuit is configured to determine a first prediction deviation and a second prediction deviation, respectively. The control circuit determines correction factor(s) for selected correction point(s) based on the first prediction deviation and the second prediction deviation. The control circuit optimizes RF coverage in coverage area(s) based on the determined correction factor(s), thus improving RF performance and capacity of the WDS.

23 Claims, 11 Drawing Sheets

OPTIMIZING RADIO FREQUENCY (RF) COVERAGE IN REMOTE UNIT COVERAGE AREAS IN A WIRELESS DISTRIBUTION SYSTEM (WDS)

PRIORITY APPLICATION

This application claims the benefit of priority under 35 U.S.C. §120 of U.S. application Ser. No. 15/263,999 filed on Sep. 13, 2016, the content of which is relied upon and incorporated herein by reference in its entirety.

BACKGROUND

The disclosure relates generally to a wireless distribution system (WDS), and more particularly to optimizing radio frequency (RF) coverage in remote unit coverage areas in a WDS network.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of WDSs. WDSs include remote units configured to receive and transmit communications signals to client devices within the antenna range of the remote units. WDSs can be particularly useful when deployed inside buildings or other indoor environments where the wireless communications devices may not otherwise be able to effectively receive RF signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as RF identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

As previously discussed, the remote units 104(1)-104(N) are configured to wirelessly distribute the communication services within the remote coverage areas 100(1)-100(N). During design or initial deployment of the WDS 102, the transmission/reception range of remote coverage areas 100(1)-100(N) may be estimated based on calculation and/or simulation tools. The estimated transmission/reception range may affect how the WDS 102 is installed and how the remote units 104(1)-104(N) are deployed to provide the desired remote coverage areas 100(1)-100(N). However, the remote coverage areas 100(1)-100(N) may not be estimated with perfect accuracy due to difficulty in accurately predicting RF characteristics in a real world environment. For instance, RF signal attenuation caused by walls, floors, and/or ceilings, RF signal reflection coefficient, and/or actual radiation pattern of the antennas 114(1)-114(N) can significantly impact the accuracy of the remote coverage areas 100(1)-100(N). In this regard, it may be desirable to optimize RF coverage in the remote coverage areas 100(1)-100(N) after the WDS 102 is deployed.

No admission is made that any reference cited herein constitutes prior art. Applicant expressly reserves the right to challenge the accuracy and pertinency of any cited documents.

SUMMARY

Embodiments of the disclosure relate to optimizing radio frequency (RF) coverage in remote unit coverage areas in a wireless distribution system (WDS). Before a WDS is initially deployed, the placement design of remote units in the WDS is based on predicted remote unit coverage areas (i.e., the transmission/reception coverage areas) from calculations and/or simulations. However, the predicted remote unit coverage areas may be different from actual remote unit coverage areas established after deployment, because RF characteristics are difficult to factor into the calculations and/or simulations due to potential signal obstruction elements (e.g., walls, floors, furniture, etc.). Hence, to optimize RF coverage in the remote unit coverage areas after the WDS is deployed, in certain aspects disclosed herein, a control circuit is provided in the WDS and communicatively coupled to the remote units forming the remote unit coverage areas. The control circuit may be provided in a central unit or located in one or more other components in the WDS as examples. The control circuit is configured to selectively determine at least one selected remote unit group including two or more remote units selected from the remote units in the WDS. A remote unit in the selected remote unit group is configured to transmit at least one RF signal to the other remote units in the selected remote unit group to determine prediction deviations (e.g., power prediction deviations) based on respective received RF signals. The control circuit is configured to determine one or more correction factors for one or more selected correction points located within an area defined by the selected remote unit group based on the prediction deviations to optimize RF coverage in the remote unit coverage areas serviced by the remote units in the selected remote unit group by correction factors. The correction factors can then be used to adjust one or more of the remote units to change the remote unit coverage areas with improved accuracy, thus improving RF performance and capacity of the WDS. By defining an appropriate number of selected remote unit groups involving different combinations of the remote units in the WDS, it is possible to optimize RF coverage in all of the remote unit coverage areas in the WDS. As a result, overall RF performance and capacity of the WDS may be improved.

One embodiment of the disclosure relates to a WDS. The WDS comprises a plurality of remote units. The plurality of remote units is configured to receive a plurality of downlink communications signals from a central unit over a plurality of downlink communications mediums and distribute the plurality of downlink communications signals in a plurality of remote unit coverage areas, respectively. The plurality of remote units is also configured to receive a plurality of uplink communications signals in the plurality of remote unit coverage areas and provide the plurality of uplink communications signals to the central unit over a plurality of uplink communications mediums, respectively. The WDS also comprises a control circuit communicatively coupled to the plurality of remote units. For at least one selected remote unit group comprising two or more remote units among the plurality of remote units, the control circuit is configured to instruct a first remote unit in the at least one selected remote unit group to transmit at least one RF signal. The control circuit is also configured to instruct a second remote unit in the at least one selected remote unit group to receive the at least one RF signal. The control circuit is also configured to determine a first prediction deviation at the second remote unit based on a difference between the at least one RF signal received at the second remote unit and the at least one RF signal predicted to be received at the second remote unit. The control circuit is also configured to instruct a third remote unit in the at least one selected remote unit group to receive the at least one RF signal. The control circuit is also configured to determine a second prediction deviation at the third remote unit based on a difference between the at least one RF signal received at the third remote unit and the at least one RF signal predicted to be received at the third remote unit. The control circuit is also configured to determine one or more correction factors for one or more selected correction points located within an area defined by the at least one selected remote unit group based on the first prediction deviation and the second prediction deviation.

Another embodiment of the disclosure relates to a method for optimizing RF coverage in remote unit coverage areas in a WDS. For at least one selected remote unit group comprising two or more remote units among a plurality of remote units in the WDS, the method comprises instructing a first remote unit in the at least one selected remote unit group to transmit at least one RF signal. The method also comprises instructing a second remote unit in the at least one selected remote unit group to receive the at least one RF signal. The method also comprises determining a first prediction deviation at the second remote unit based on a difference between the at least one RF signal received at the second remote and the at least one RF signal predicted to be received at the second remote unit. The method also comprises instructing a third remote unit in the at least one selected remote unit group to receive the at least one RF signal. The method also comprises determining a second prediction deviation at the third remote unit based on a difference between the at least one RF signal received at the third remote unit and the at least one RF signal predicted to be received at the third remote unit. The method also comprises determining one or more correction factors for one or more selected correction points located within an area defined by the at least one selected remote unit group based on the first prediction deviation and the second prediction deviation.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to optimizing radio frequency (RF) coverage in remote unit coverage areas in a wireless distribution system (WDS). Before a WDS is initially deployed, the placement design of remote units in the WDS is based on predicted remote unit coverage areas (i.e., the transmission/reception coverage areas) from calculations and/or simulations. However, the predicted remote unit coverage areas may be different from actual remote unit coverage areas established after deployment, because RF characteristics are difficult to factor into the calculations and/or simulations due to potential signal obstruction elements (e.g., walls, floors, furniture, etc.). Hence, to optimize RF coverage in the remote unit coverage areas after the WDS is deployed, in certain aspects disclosed herein, a control circuit is provided in the WDS and communicatively coupled to the remote units forming the remote unit coverage areas. The control circuit may be provided in a central unit or located in one or more other components in the WDS as examples. The control circuit is configured to selectively determine at least one selected remote unit group including two or more remote units selected from the remote units in the WDS. A remote unit in the selected remote unit group is configured to transmit at least one RF signal to the other remote units in the selected remote unit group to determine prediction deviations (e.g., power prediction deviations) based on respective received RF signals. The control circuit is configured to determine one or more correction factors for one or more selected correction points located within an area defined by the selected remote unit group based on the prediction deviations to optimize RF coverage in the remote unit coverage areas serviced by the remote units in the selected remote unit group by correction factors. The correction factors can then be used to adjust one or more of the remote units to change the remote unit coverage areas with improved accuracy, thus improving RF performance and capacity of the WDS. By defining an appropriate number of selected remote unit groups involving different combinations of the remote units in the WDS, it is possible to optimize RF coverage in all of the remote unit coverage areas in the WDS. As a result, overall RF performance and capacity of the WDS may be improved.

Figure 1:
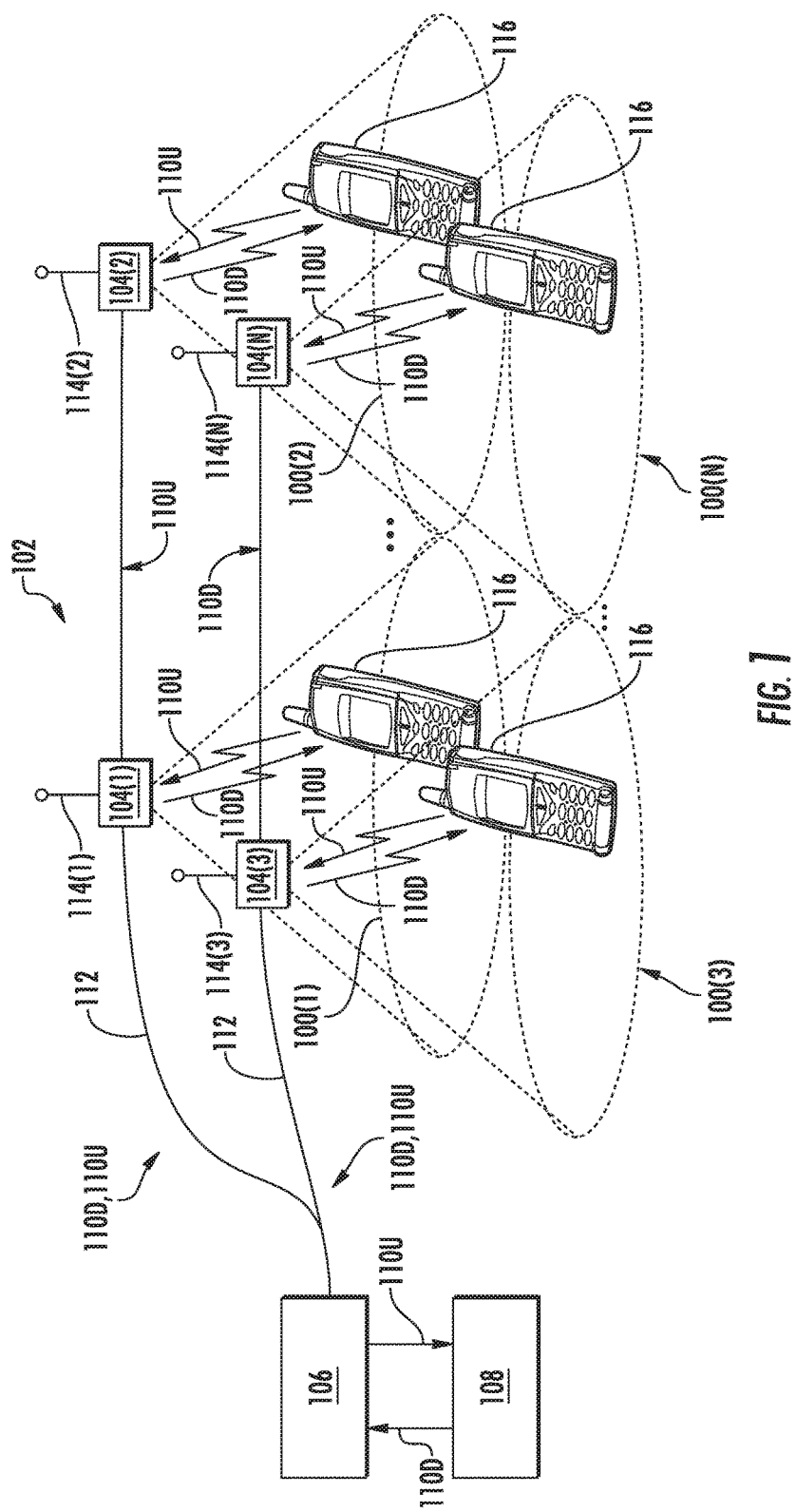
FIG. 1 is a schematic diagram of an exemplary wireless distribution system (WDS)
Figure 2:
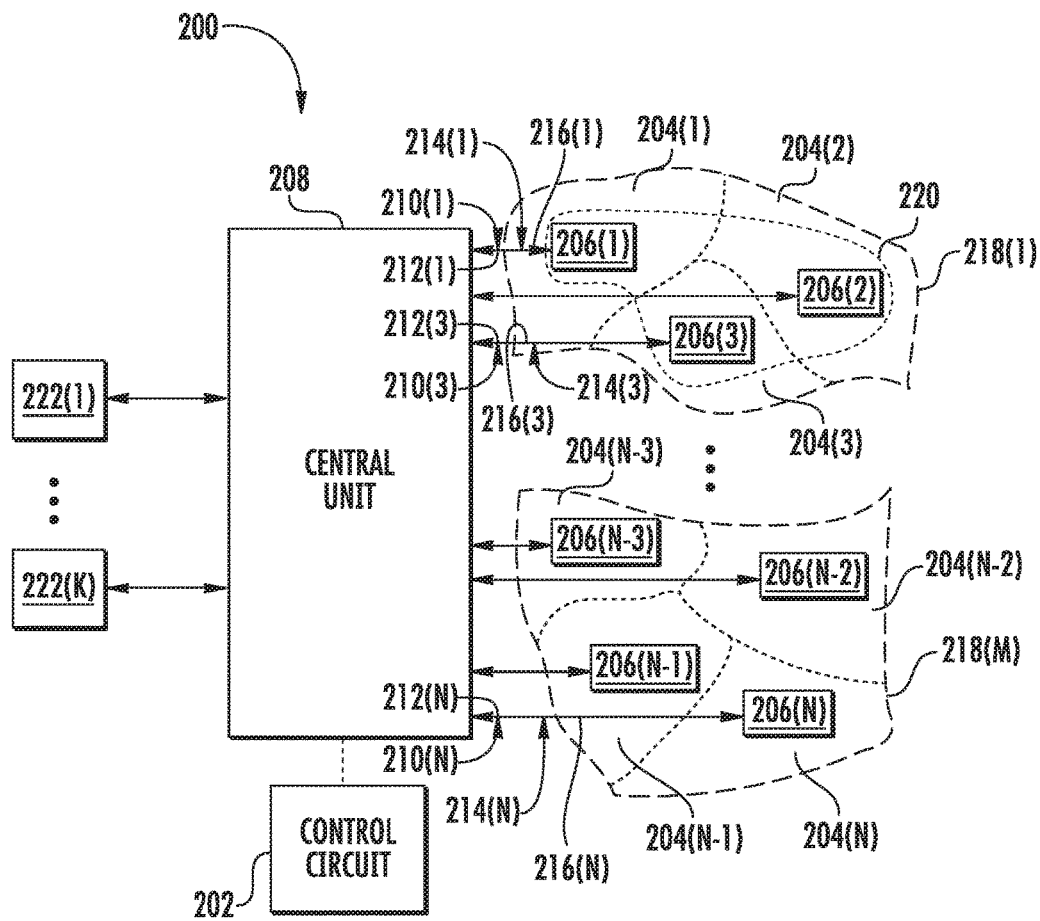
FIG. 2 is a schematic diagram of an exemplary WDS in which a control circuit is configured to optimize radio frequency (RF) coverage in a plurality of remote unit coverage areas in the WDS based on RF signal power levels measured in selected remote unit coverage areas among the remote unit coverage areas.

In this regard, FIG. 2 is a schematic diagram of an exemplary WDS 200 in which a control circuit 202 is configured to optimize RF coverage in a plurality of remote unit coverage areas 204(1)-204(N) in the WDS 200 based on actual RF signal power levels measured in selected remote unit coverage areas among the remote unit coverage areas 204(1)-204(N). The WDS 200 includes a plurality of remote units 206(1)-206(N) and a central unit 208. In a non-limiting example, the control circuit 202 can be provided in the central unit 208 as a centralized control circuit or one or more of the remote units 206(1)-206(N) as a distributed control circuit. The control circuit 202 may also be hosted in other computing elements in the WDS 200. The remote units 206(1)-206(N) are configured to receive a plurality of downlink communications signals 210(1)-210(N) from the central unit 208 over a plurality of downlink communications mediums 212(1)-212(N), and distribute the received downlink communications signals 210(1)-210(N) to one or more client devices in the remote unit coverage areas 204(1)-204(N), respectively. The remote units 206(1)-206(N) are also configured to receive a plurality of uplink communications signals 214(1)-214(N) from the one or more client devices in the remote unit coverage areas 204(1)-204(N). The remote units 206(1)-206(N) are configured to provide the received uplink communications signals 214(1)-214(N) to the central unit 208 over a plurality of uplink communications mediums 216(1)-216(N), respectively. In this regard, the remote units 206(1)-206(N) are configured to provide downlink and uplink communications services in the remote unit coverage areas 204(1)-204(N), respectively.

With continuing reference to FIG. 2, the remote unit coverage areas 204(1)-204(N) may be organized into one or more cell areas 218(1)-218(M). In a non-limiting example, the cell areas 218(1)-218(M) are defined based on communication services (e.g., long-term evolution (LTE)) and/or physical premises (e.g., buildings or floors within buildings). Each of the cell areas 218(1)-218(M) may include one or more of the remote unit coverage areas 204(1)-204(N). For example, the cell area 218(1) includes the remote unit coverage areas 204(1)-204(3), and the cell area 218(M) includes the remote unit coverage areas 204(N-3)-204(N).

In a non-limiting example, the remote unit coverage areas 204(1)-204(N) are determined based on intended coverage areas for a particular deployment layout/design using simulation tools. The remote units 206(1)-206(N) are deployed in the remote unit coverage areas 204(1)-204(N) when the WDS 200 is initially deployed. Accordingly, the remote units 206(1)-206(N) are configured to transmit the downlink communications signals 210(1)-210(N) in respective predicted transmitting power levels to sufficiently cover the remote unit coverage areas 204(1)-204(N). In a non-limiting example, the respective predicted transmitting power levels are determined to ensure client devices located at a boundary of the remote unit coverage areas 204(1)-204(N) can receive the downlink communications signals 210(1)-210(N) with predicted signal strengths. The remote units 206(1)-206(N) are also configured to receive the uplink communications signals 214(1)-214(N) in respective predicted receiving power levels to provide adequate signal-to-noise ratios (SNRs) in the received uplink communications signals 214(1)-214(N).

However, it may be difficult for the simulation tools to factor in RF characteristics of various signal obstruction elements (e.g., physical obstructions and/or reflectors such as walls, floors, furniture, etc.) that may have a significant impact on propagations of the downlink communications signals 210(1)-210(N) and/or the uplink communications signals 214(1)-214(N) in the remote unit coverage areas 204(1)-204(N). For example, propagations of the downlink communications signals 210(1)-210(N) and or the uplink communications signals 214(1)-214(N) can be impacted by the signal obstruction elements and their related RF characteristics (e.g., attenuation and/or reflection factors). In a non-limiting example, the signal obstruction elements can attenuate one or more of the downlink communications signals 210(1)-210(N), thus causing one or more of the remote unit coverage areas 204(1)-204(N) to be reduced compared to predicted remote unit coverage areas determined using simulation tools. As a result, dead spots may be created in the remote unit coverage areas 204(1)-204(N), thus preventing client devices from receiving the downlink communications signals 210(1)-210(N) correctly. In another non-limiting example, the signal obstruction elements can alter propagation path of the uplink communications signal 214(1) transmitted by a client device in the remote unit coverage area 204(1), thus causing the uplink communications signal 214(1) to be received by the remote unit 206(2) in the remote unit coverage area 204(2) instead. Hence, it may be desirable to optimize RF coverage in the remote unit coverage areas 204(1)-204(N) based on more accurate determination of the RF characteristics of the signal obstruction elements in the WDS 200.

In this regard, the control circuit 202, which is communicatively coupled to the remote units 206(1)-206(N), is configured to determine prediction deviations based on at least one RF signal communicated in at least one selected remote unit group 220. The selected remote unit group 220 includes two or more remote units selected among the remote units 206(1)-206(N) in the WDS 200. For the convenience of illustration and reference, the selected remote unit group 220 discussed hereinafter includes three remote units that define a triangular-shaped coverage area. It shall be appreciated that it is also possible to form the selected remote unit group 220 with two remote units or more than three remote units. For example, the selected remote unit group 220 can be formed with four remote units, thus defining a quadrangular-shaped coverage area, or with five remote units, thus defining a pentagonal-shaped coverage area, and so on. As will be described in more detail below, the control circuit 202 is further configured to optimize RF coverage in the remote unit coverage areas 204(1)-204(N) serviced by the three remote units in the selected remote unit group 220 based on the determined prediction deviations. Specifically, an RF signal transmitted by one of three remote units in the selected remote unit group 220 can be received at two other remote units in the selected remote unit group 220. The RF signal actually received at the two other remote units can be compared to the RF signal predicted to be received at the two other remote units to determine two prediction deviations at the two other remote units. Accordingly, two correction factors may be determined for reception at locations of the two other remote units, respectively. The determined two correction factors can be used subsequently to determine a correction factor for a selected correction point within an area defined by the three remote units. In a non-limiting example, the correction factor for the selected correction point is proportional to linear distances between the selected correction point and the three remote units in the selected remote unit group 220. As such, it is possible to adjust (e.g., increase or decrease) the actual power level of the RF signal based on the determined correction factor for the selected correction point.

By determining the prediction deviations based on the RF signal(s) communicated in the selected remote unit group 220, it is possible for the control circuit 202 to more accurately determine RF characteristics of the signal obstruction elements in an area defined by the three remote units in the selected remote unit group 220, thus optimizing RF coverage in the remote unit coverage areas 204(1)-204 (N) serviced by the three remote units in the selected remote unit group 220. Accordingly, by defining an appropriate number of selected remote unit groups involving different combinations of the remote units 206(1)-206(N), it is possible to determine prediction deviations in these selected remote unit groups, thus optimizing RF coverage in all of the remote unit coverage areas 204(1)-204(N) in the WDS 200. As a result, overall RF performance and capacity of the WDS 200 may be improved.

For the convenience of illustration and discussion, the selected remote unit group 220 as shown therein includes the remote unit 206(1), the remote unit 206(2), and the remote unit 206(3). It shall be appreciated that the selected remote unit group 220 can be defined based on any of the remote units 206(1)-206(N) in the WDS 200. For example, the selected remote unit group 220 can be constructed to include the remote unit 206(1), the remote unit 206(N-3), and the remote unit 206(N), or any other remote unit combination as appropriate. In addition, it is possible for any of the remote units 206(1)-206(N) to be included in more than one selected remote unit group. It shall be further appreciated that the mechanisms for optimizing RF coverage in the remote unit coverage areas 204(1)-204(3) discussed with reference to the selected remote unit group 220 can be used to optimize RF coverage in any of the remote unit coverage areas 204(1)-204(N) in the WDS 200.

Figure 3:
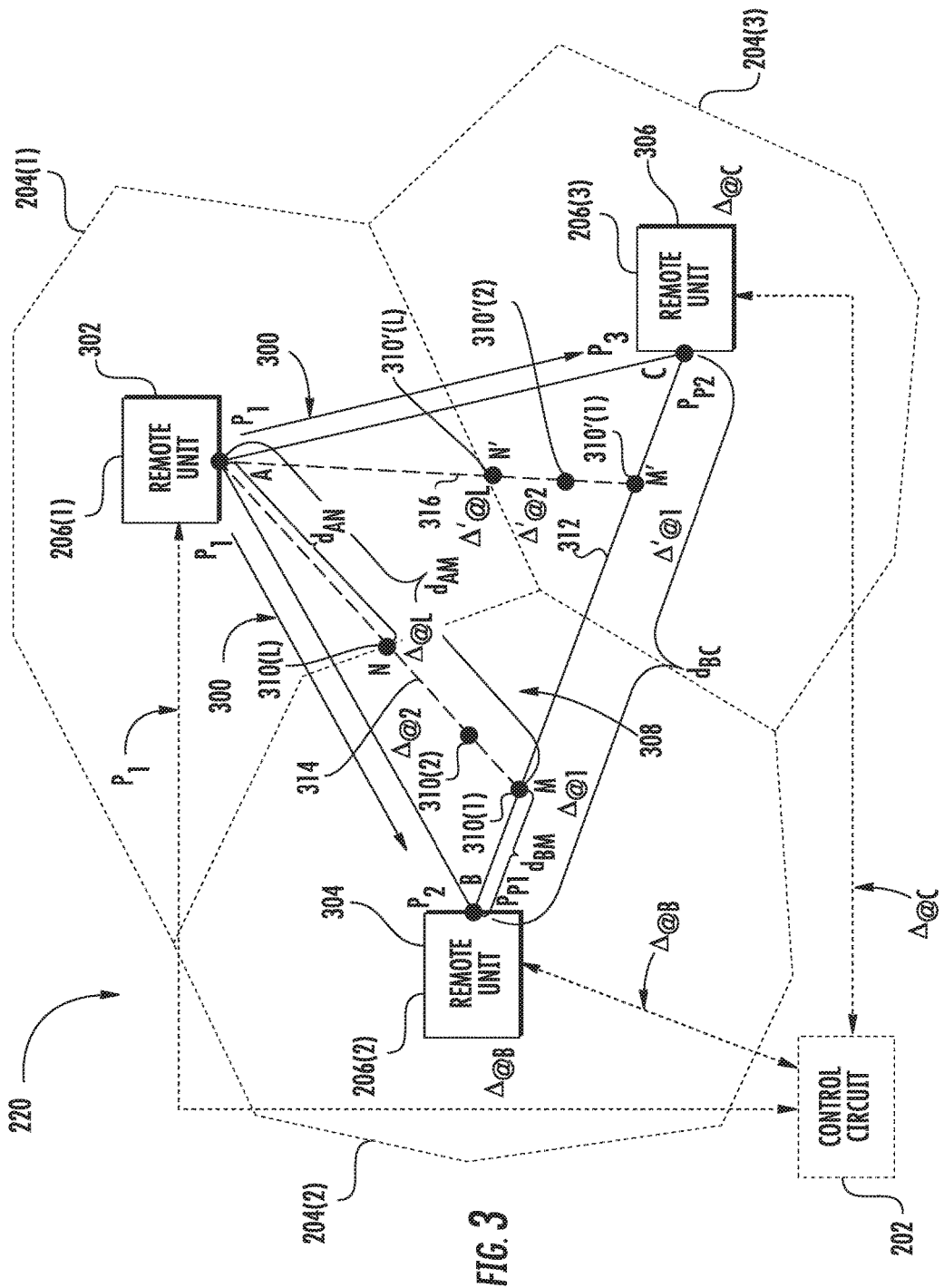
FIG. 3 is a schematic diagram providing an exemplary illustration of at least one selected remote unit group that can be configured to determine prediction deviations among three remote units in the selected remote unit group based on at least one RF signal.

In this regard, FIG. 3 is a schematic diagram providing an exemplary illustration of the selected remote unit group 220 of FIG. 2 that can be configured to determine prediction deviations among the three remote units 206(1)-206(3) in this example based on at least one RF signal 300. Common elements between FIGS. 2 and 3 are shown therein with common element numbers and will not be re-described herein. As discussed above, an RF signal transmitted by one of three remote units in the selected remote unit group 220 can be received at two other remote units in the selected remote unit group 220. The RF signal actually received at the two other remote units can be compared to the RF signal predicted to be received at the two other remote units to determine two prediction deviations at the locations of the two other remote units. Accordingly, two correction factors may be determined for the locations of the two other remote units, respectively. The determined two correction factors can be used subsequently to determine a correction factor for a selected correction point within an area defined by the three remote units. In a non-limiting example, the correction factor for the selected correction point is proportional to linear distances between the selected correction point and the three remote units in the selected remote unit group 220. As such, it is possible to adjust (e.g., increase or decrease) the actual power level of the RF signal based on the determined correction factor for the selected correction point.

In one embodiment, power level of the RF signal transmitted by one of the three remote units in the selected remote unit group 220 can be measured at the two other remote units in the selected remote unit group 220. The two measured actual power levels can be compared to two predicted power levels for the two other remote units to determine two power prediction deviations at the locations of the two other remote units. Accordingly, two power correction factors may be determined for the locations of the two other remote units, respectively. The determined two power correction factors can be used subsequently to determine a power correction factor for a selected correction point within an area defined by the three remote units. In this regard, with reference to FIG. 3, in a non-limiting example, the remote units 206(1)-206(3) in the selected remote unit group 220 are designated as a first remote unit 302 (also referenced as point A), a second remote unit 304 (also referenced as point B), and a third remote unit 306 (also referenced as point C), respectively. The control circuit 202 is communicatively coupled to the first remote unit 302, the second remote unit 304, and the third remote unit 306. It shall be appreciated that any of the remote units 206(1)-206(3) can be designated as the first remote unit 302 without adversely impacting determination of the prediction deviations in the selected remote unit group 220.

The first remote unit 302, the second remote unit 304, and the third remote unit 306 define an area 308. In a non-limiting example, the area 308 is a triangular-shaped area defined by point A, point B, and point C. The control circuit 202 is configured to instruct the first remote unit 302 in the selected remote unit group 220 to transmit the RF signal 300 at a first actual power level $P_1$. In response to receiving instructions from the control circuit 202, the first remote unit 302 is configured to transmit the RF signal 300 to the second remote unit 304 and the third remote unit 306 in the selected remote unit group 220 concurrently. As the RF signal 300 propagates through the area 308, one or more signal obstruction elements may cause the first actual power level $P_1$ of the RF signal 300 to change when the RF signal 300 arrives at the second remote unit 304 and the third remote unit 306. In this regard, the second remote unit 304 may receive the RF signal 300 at a second actual power level $P_2$, and the third remote unit 306 may receive the RF signal 300 at a third actual power level $P_3$. In the meantime, the second remote unit 304 and the third remote unit 306 may have been previously predicted by the simulation tools prior to deployment to receive the RF signal 300 at a first predicted receiving power level $Pp_1$ and a second predicted receiving power level $Pp_2$, respectively. As such, RF signal obstruction elements may be causing the second actual power level $P_2$ at the second remote unit 304 to be different from the first predicted receiving power level $Pp_1$ at the second remote unit 304. Likewise, RF signal obstruction elements may be causing the third actual power level $P_3$ the third remote unit 306 to be different from the second predicted receiving power level $Pp_2$ at the third remote unit 306. The control circuit 202 is aware of the first predicted receiving power level $Pp_1$ at the second remote unit 304 and the second predicted receiving power level $Pp_2$ at the third remote unit 306. In a non-limiting example, the control circuit 202 stores the first predicted receiving power level $Pp_1$ and the second predicted receiving power level $Pp_2$ in a storage media.

In this regard, the control circuit 202 instructs the second remote unit 304 to receive the RF signal 300 at the second actual power level $P_2$. In a non-limiting example, the second remote unit 304 communicates the second actual power level $P_2$ to the control circuit 202. Subsequently, the control circuit 202 determines a first power prediction deviation $\Delta_{@B}$ at the second remote unit 304 by subtracting the first predicted receiving power level $Pp_1$ from the second actual power level $P_2$. According to previous discussions in FIG. 2, the control circuit 202 may be provided in the second remote unit 304. As such, it shall be appreciated that it is possible for the second remote unit 304 to determine the first power prediction deviation $\Delta_{@B}$ as well. The control circuit 202 also instructs the third remote unit 306 to receive the RF signal 300 at the third actual power level $P_3$. In a non-limiting example, the third remote unit 306 communicates the third actual power level $P_3$ to the control circuit 202. Subsequently, the control circuit 202 determines a second power prediction deviation $\Delta_{@C}$ at the third remote unit 306 by subtracting the second predicted receiving power level $Pp_2$ from the third actual power level $P_3$. According to previous discussions in FIG. 2, the control circuit 202 may be provided in the third remote unit 306. As such, it shall be appreciated that it is possible for the third remote unit 306 to determine the second power prediction deviation $\Delta_{@C}$ as well.

With continuing reference to FIG. 3, the control circuit 202 is then further configured to determine one or more correction factors $\Delta_{@1}$-$\Delta_{@L}$ for one or more selected correction points 310(1)-310(L) located in the area 308, respectively, based on the power prediction deviations $A_{@B}$ and $\Delta_{@C}$. In a non-limiting example, the selected correction point 310(1) (also referenced as point M) is located on a first straight line 312 connecting points B and C. As is further discussed later, the correction factors $\Delta_{@1}$-$\Delta_{@L}$ can be either power correction factors or path loss correction factors. In the same non-limiting example, the selected correction point 310(L) (also referenced as point N) is located on a second straight line 314 connecting points A and M. The control circuit 202 is configured to determine the correction factor $\Delta_{@1}$ for the selected correction point 310(1) based on the equation (Eq. 1) below.

$$\Delta_{@1}=(d_{BM}/d_{BC})\times(\Delta_{@C}-\Delta_{@B})+\Delta_{@B} \quad (\text{Eq. 1})$$

With reference to Eq. 1, $d_{BM}$ refers to a linear distance from point B to point M, and $d_{BC}$ refers to a linear distance from point B to point C. In this regard, the control circuit 202 can determine a respective correction factor for any correction point located on the first straight line 312 based on Eq. 1. The control circuit 202 is configured to determine the correction factor $\Delta_{@L}$ based on the equation (Eq. 2) below.

$$\Delta_{@L}=(d_{AN}/d_{AM})\times\Delta_{@1} \quad (\text{Eq. 2})$$

With reference to Eq. 2, $d_{AN}$ refers to a linear distance from point A to point N and $d_{AM}$ refers to a linear distance from point A to point M. In this regard, the control circuit 202 can determine correction factors $\Delta_{@2}$-$\Delta_{@L}$ for the selected correction points 310(2)-310(L) located on the second straight line 314 based on Eq. 2. Thus, the control circuit 202 can determine a respective correction factor for any correction point located within the area 308 based on Eq. 1 and Eq. 2. For example, by moving the selected correction point 310(1) (point M) to a selected correction point 310'(1) (point M') along the first straight line 312, the control circuit 202 can determine a correction factor $\Delta'_{@1}$ for the selected correction point 310'(1) based on Eq. 1. Further, the control circuit 202 can determine correction factors $\Delta'_{@2}$-$\Delta'_{@L}$ for the selected correction points 310'(2)-310'(L) located on a third straight line 316 connecting the points A and M' based on Eq. 2.

Figure 4:
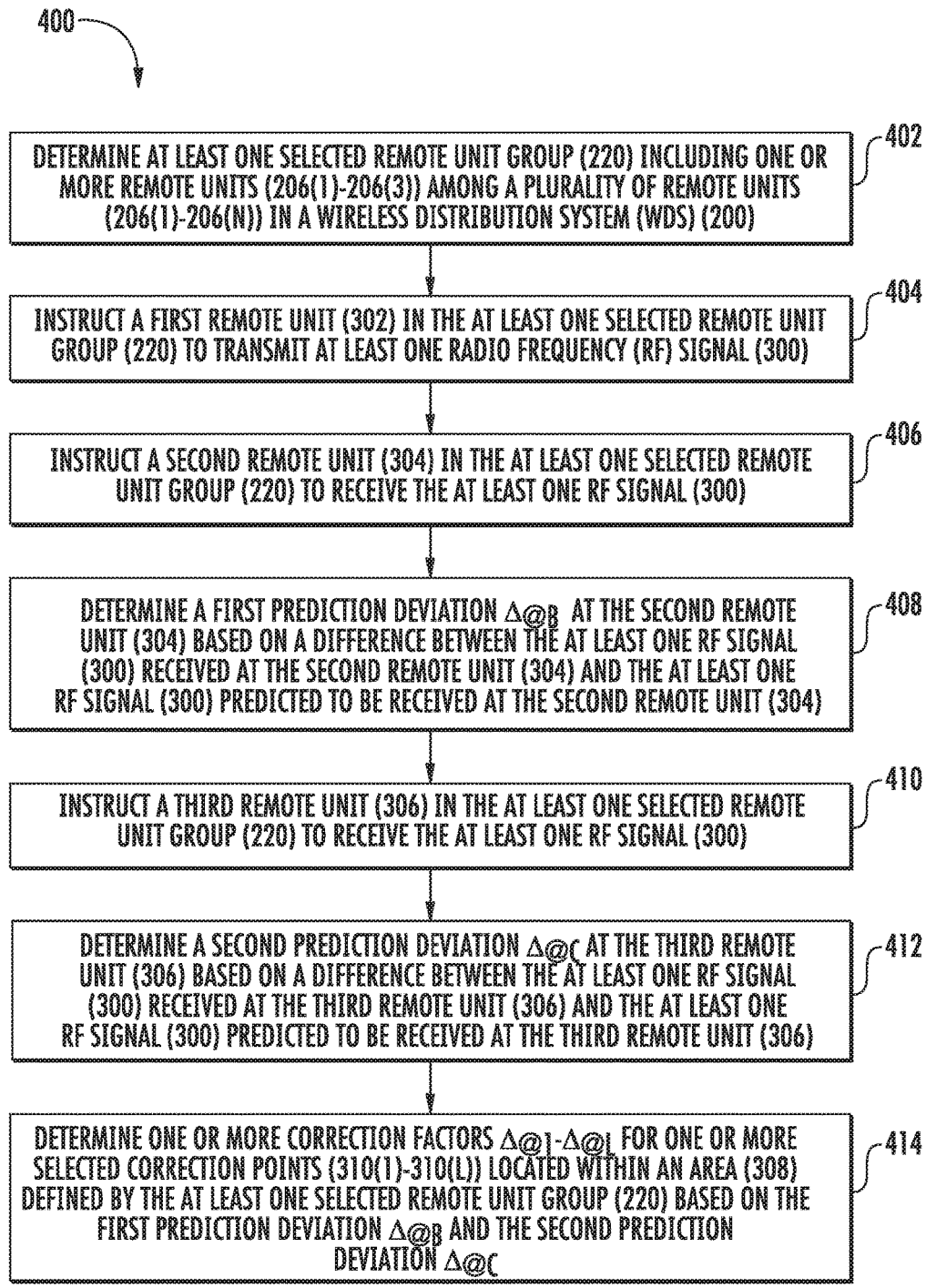
FIG. 4 is a flowchart of an exemplary process of the control circuit of FIG. 2 for optimizing RF coverage for reception at locations of the remote unit coverage areas in the WDS based on RF signal power levels measured in selected remote unit coverage areas among the remote unit coverage areas.

With reference back to FIG. 2, the control circuit 202 can be configured to optimize RF coverage in the remote unit coverage areas 204(1)-204(N) according to a process. In this regard, FIG. 4 is a flowchart of an exemplary process 400 of the control circuit 202 of FIG. 2 for optimizing RF coverage for reception at locations of the remote unit coverage areas 204(1)-204(N) in the WDS 200;

With reference to FIG. 4, the control circuit 202 determines the selected remote unit group 220 including the remote units 206(1)-206(3) among the remote units 206(1)-206(N) in the WDS 200 (block 402). The control circuit 202 instructs the first remote unit 302 in the selected remote unit group 220 to transmit the RF signal 300 (block 404). The control circuit 202 instructs the second remote unit 304 in the selected remote unit group 220 to receive the RF signal 300 (block 406). The control circuit 202 determines the first power prediction deviation $\Delta_{@B}$ at the second remote unit 304 based on the difference between the RF signal 300 received at the second remote unit 304 and the RF signal 300 predicted to be received at the second remote unit 304 (block 408). The control circuit 202 instructs the third remote unit 306 in the selected remote unit group 220 to receive the RF signal 300 (block 410). The control circuit 202 determines the second power prediction deviation $\Delta_{@C}$ at the third remote unit 306 based on the difference between the RF signal 300 received at the third remote unit 306 and the RF signal 300 predicted to be received at the third remote unit 306 (block 412). The control circuit 202 determines the correction factors $\Delta_{@1}$-$\Delta_{@L}$ for the selected correction points 310(1)-310(L) located within the area 308 defined by the selected remote unit group 220 based on the first power prediction deviation $\Delta_{@B}$ and the second power prediction deviation $\Delta_{@C}$ (block 414).

Figure 5A:
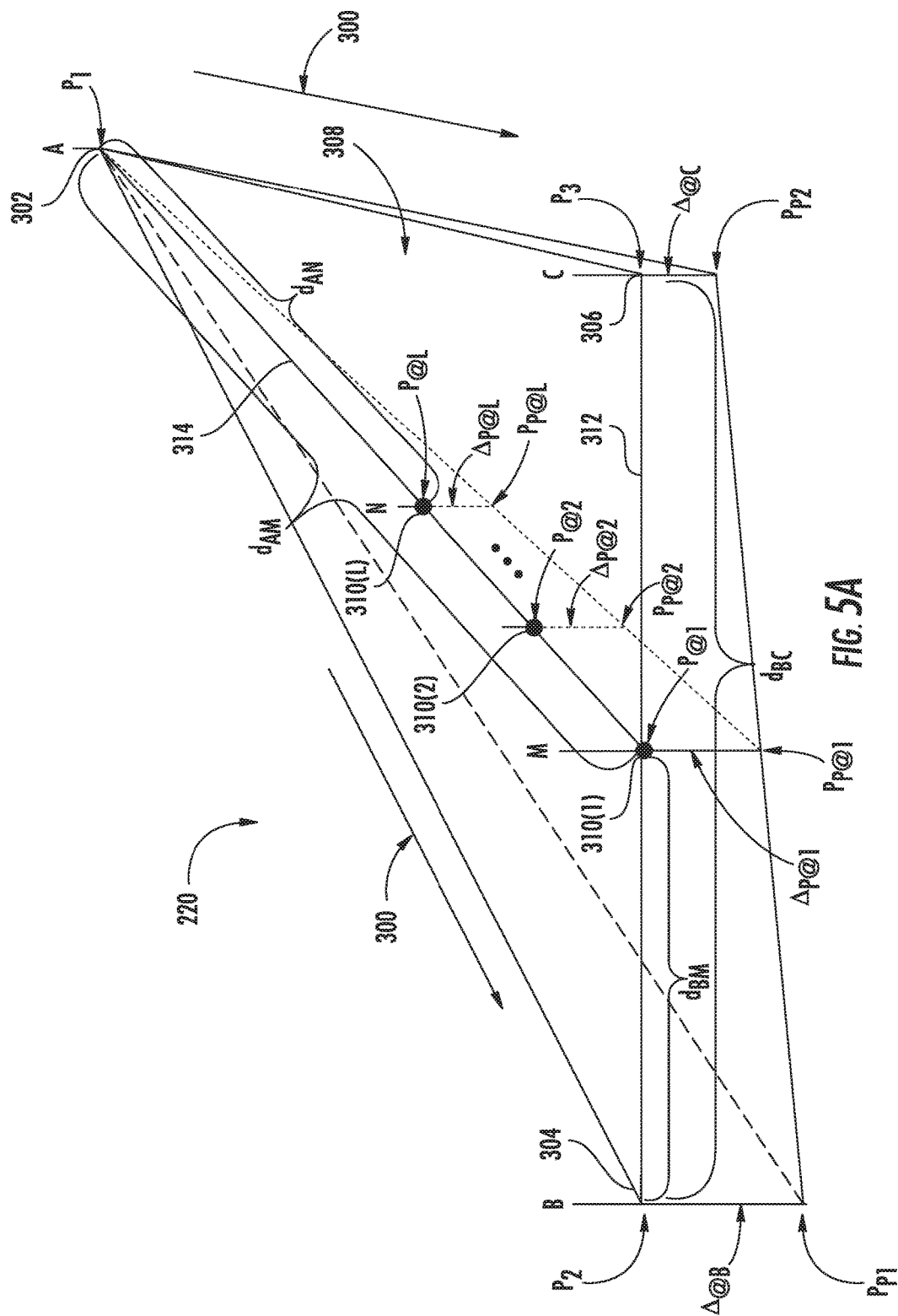
FIG. 5A is a schematic diagram providing an exemplary illustration of the at least one selected remote unit group of FIG. 3 for determining one or more power correction factors based on a first power prediction deviation and a second power prediction deviation.

With reference back to FIG. 3, in a first non-limiting example, the correction factors $\Delta_{@1}$-$\Delta_{@L}$ may be one or more power correction factors $\Delta P_{@1}$-$\Delta P_{@L}$ for the selected correction points 310(1)-310(L). In this regard, FIG. 5A is a schematic diagram providing an exemplary illustration of the selected remote unit group 220 of FIG. 3 for determining the power correction factors $\Delta P_{@1}$-$\Delta P_{@L}$ based on the first power prediction deviation $\Delta_{@B}$ and the second power prediction deviation $\Delta_{@C}$. Common elements between FIGS. 2, 3, and 5A are shown therein with common element numbers and will not be re-described herein.

With reference to FIG. 5A, the control circuit 202 is configured to determine the power correction factors $\Delta P_{@1}$-$\Delta P_{@L}$ based on the first power prediction deviation $\Delta_{@B}$ and the second power prediction deviation $\Delta_{@C}$. The control circuit 202 is configured to determine the power correction factor $\Delta P_{@1}$ for the selected correction point 310(1) based on the equation (Eq. 3) below.

$$\Delta P_{@1} = (d_{BM}/d_{BC}) \times (\Delta_{@C} - \Delta_{@B}) \Delta_{@B} \quad \text{(Eq. 3)}$$

With reference to Eq. 3, $d_{BM}$ refers to the linear distance from point B to point M, and $d_{BC}$ refers to the linear distance from point B to point C. In this regard, the control circuit 202 can determine the respective power correction factor for any correction point located on the first straight line 312 based on Eq. 3. The control circuit 202 is configured to determine the power correction factor $\Delta P_{@L}$ based on the equation (Eq. 4) below.

$$\Delta P_{@L} = (d_{AN}/d_{AM}) \times \Delta P_{@1} \quad \text{(Eq. 4)}$$

With reference to Eq. 4, $d_{AN}$ refers to the linear distance from point A to point N, and $d_{AM}$ refers to the linear distance from point A to point M. In this regard, the control circuit 202 can determine the power correction factors $\Delta P_{@2}$-$\Delta P_{@L}$ for the selected correction points 310(2)-310(L) located on the second straight line 314 based on Eq. 4. Thus, the control circuit 202 can determine the respective power correction factor for any correction point located within the area 308 based on Eq. 3 and Eq. 4.

Based on the determined power correction factors $\Delta P_{@1}$-$\Delta P_{@L}$, the control circuit 202 is able to determine whether actual power levels $P_{@1}$-$P_{@L}$ at the selected correction points 310(1)-310(L) are higher than, lower than, or equal to predicted power levels $P_{P@1}$-$P_{P@L}$ at the selected correction points 310(1)-310(L). In a non-limiting example, the control circuit 202 can determine that the actual power levels $P_{@1}$-$P_{@L}$ at the selected correction points 310(1)-310(L) are higher than the predicted power levels $P_{P@1}$-$P_{P@L}$ when the power correction factors $\Delta_{P@1}$-$\Delta_{P@L}$ are greater than zero (0). Likewise, the control circuit 202 can determine that the actual power levels $P_{@1}$-$P_{@L}$ at the selected correction points 310(1)-310(L) are lower than the predicted power levels $P_{P@1}$-$P_{P@L}$ when the power correction factors $\Delta_{P@1}$-$\Delta_{P@L}$ are less than 0. Similarly, the control circuit 202 can determine that the actual power levels $P_{@1}$-$P_{@L}$ at the selected correction points 310(1)-310(L) are equal to the predicted power levels $P_{P@1}$-$P_{P@L}$ when the power correction factors $\Delta_{P@1}$-$\Delta_{P@L}$ are equal to 0. Further, the control circuit 202 may determine that some of the actual power levels $P_{@1}$-$P_{@L}$ at the selected correction points 310(1)-310(L) are higher than the predicted power levels $P_{P@1}$-$P_{P@L}$, some of the actual power levels $P_{@1}$-$P_{@L}$ at the selected correction points 310(1)-310(L) are lower than the predicted power levels $P_{P@1}$-$P_{P@L}$, and some of the actual power levels $P_{@1}$-$P_{@L}$ at the selected correction points 310(1)-310(L) are equal to the predicted power levels $P_{P@1}$-$P_{P@L}$. Accordingly, the control circuit 202 can control the first remote unit 302 to decrease, increase, or maintain the first power level $P_1$ of the RF signal 300 in response to determining that the actual power levels $P_{@1}$-$P_{@L}$ at the selected correction points 310(1)-310(L) are higher than, lower than, or equal to the predicted power levels $P_{P@1}$-$P_{P@L}$ at the selected correction points 310(1)-310(L).

Figure 5B:
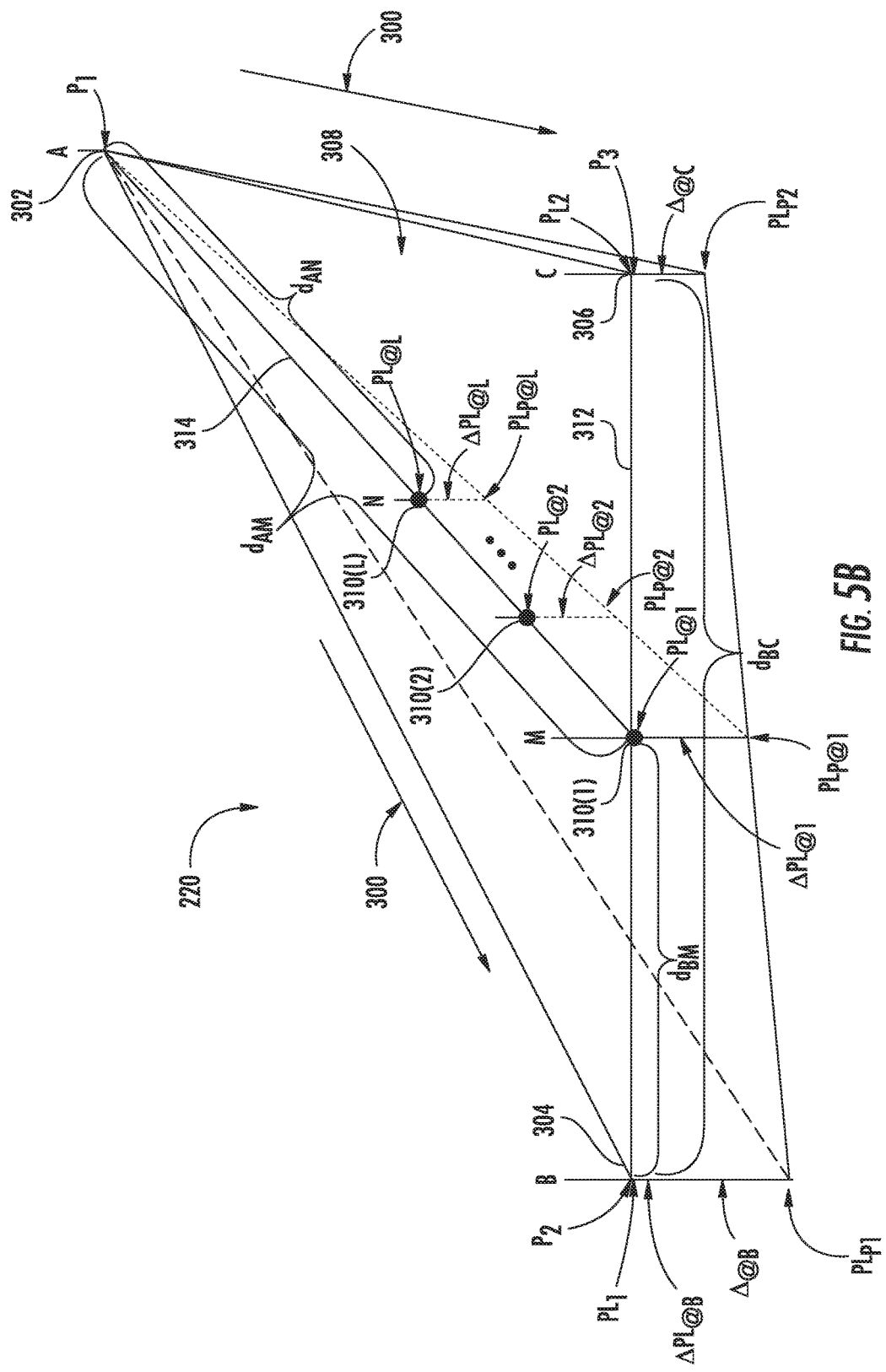
FIG. 5B is a schematic diagram providing an exemplary illustration of the selected remote unit group of FIG. 3 for determining one or more path loss correction factors based on a first power prediction deviation and a second power prediction deviation.

With reference back to FIG. 3, in a second non-limiting example, the correction factors $\Delta_{@1}$-$\Delta_{@L}$, may be one or more path loss correction factors $\Delta PL_{@1}$-$\Delta PL_{@L}$ for the selected correction points 310(1)-310(L). In this regard, FIG. 5B is a schematic diagram providing an exemplary illustration of the selected remote unit group 220 of FIG. 3 for determining the path loss correction factors $\Delta PL_{@1}$-$\Delta PL_{@L}$ based on the first power prediction deviation $\Delta_{@B}$ and the second power prediction deviation $\Delta_{@C}$. Common elements between FIGS. 2, 3, and 5B are shown therein with common element numbers and will not be re-described herein.

With reference to FIG. 5B, the control circuit 202 is configured to determine a first actual path loss $PL_1$ at the second remote unit 304 based on the second actual power level $P_2$ and the first actual power level $P_1$ of the RF signal 300. The control circuit 202 is further configured to determine a first path loss prediction deviation $\Delta PL_{@B}$ based on a difference between the first actual path loss $PL_1$ and a first predicted path loss $PL_{P1}$ at the second remote unit 304. Similarly, the control circuit 202 is configured to determine a second actual path loss $PL_2$ at the third remote unit 306 based on a difference between the third actual power level $P_3$ and the first actual power $P_1$ of the RF signal 300. The control circuit 202 is further configured to determine a second path loss prediction deviation $\Delta PL_{@C}$ based on the determined second actual path loss $PL_2$ and a second predicted path loss $PL_{P2}$ at the third remote unit 306. The control circuit 202 is configured to determine the path loss correction factor $\Delta PL_{@1}$ for the selected correction point 310(1) based on the equation (Eq. 5) below.

$$\Delta PL_{@1} = (d_{BM}/d_{BC}) \times (\Delta PL_{@C} - \Delta PL_{@B}) + \Delta PL_{@B} \quad \text{(Eq. 5)}$$

With reference to Eq. 5, $d_{BM}$ refers to the linear distance from point B to point M, and $d_{BC}$ refers to the linear distance from point B to point C. In this regard, the control circuit 202 can determine the respective path loss correction factor for any correction point located on the first straight line 312 based on Eq. 5. The control circuit 202 is configured to determine the path loss correction factors $\Delta P_{@L}$ based on the equation (Eq. 6) below.

$$\Delta PL_{@L} = (d_{AN}/d_{AM}) \times \Delta PL_{@1} \quad \text{(Eq. 6)}$$

With reference to Eq. 6, $d_{AN}$ refers to the linear distance from point A to point N, and $d_{AM}$ refers to the linear distance from point A to point M. In this regard, the control circuit 202 can determine the path loss correction factors $\Delta PL_{@2}$-$\Delta PL_{@L}$ for the selected correction points 310(2)-310(L)

located on the second straight line 314 based on Eq. 6. Thus, the control circuit 202 can determine the respective path loss correction factor for any correction point located within the area 308 based on Eq. 5 and Eq. 6.

Based on the path loss correction factors $\Delta PL_{@1}$-$\Delta PL_{@L}$, the control circuit 202 is able to determine whether actual path losses $PL_{@1}$-$PL_{@L}$ at the selected correction points 310(1)-310(L) are higher than, lower than, or equal to predicted path losses $PL_{P@1}$-$PL_{P@L}$ at the selected correction points 310(1)-310(L). In a non-limiting example, the control circuit 202 can determine that the actual path losses $PL_{@1}$-$PL_{@L}$ at the selected correction points 310(1)-310(L) are higher than the predicted path losses $PL_{P@1}$-$PL_{P@L}$ when the path loss correction factors $\Delta PL_{@1}$-$\Delta PL_{@L}$ are greater than zero (0). Likewise, the control circuit 202 can determine that the actual path losses $PL_{@1}$-$PL_{@L}$ at the selected correction points 310(1)-310(L) are lower than the predicted path losses $PL_{P@1}$-$PL_{P@L}$ when the path loss correction factors $\Delta PL_{@1}$-$\Delta PL_{@L}$ are less than 0. Similarly, the control circuit 202 can determine that the actual path losses $PL_{@1}$-$PL_{@L}$ at the selected correction points 310(1)-310(L) are equal to the predicted path losses $PL_{P@1}$-$PL_{P@L}$ when the path loss correction factors $\Delta PL_{@1}$-$\Delta PL_{@L}$ are equal to 0. Accordingly, the control circuit 202 can control the first remote unit 302 to increase, decrease, or maintain the first actual power level $P_1$ of the RF signal 300 in response to determining that the actual path losses $PL_{@1}$-$PL_{@L}$ at the selected correction points 310(1)-310(L) are respectively higher than, lower than, or equal to the predicted path losses $PL_{P@1}$-$PL_{P@L}$ at the selected correction points 310(1)-310(L).

With reference back to FIG. 3, in a non-limiting example, the first remote unit 302 in the selected remote unit group 220 is configured to transmit the RF signal 300 that includes at least one non-modulated continuous wave signal. The non-modulated continuous wave signal can help improve receiver sensitivity at the second remote unit 304 and the third remote unit 306 in the selected remote unit group 220. Accordingly, RF receivers at the second remote unit 304 and the third remote unit 306 are configured to receive the non-modulated continuous wave signal at a defined RF filter bandwidth, which can be one kilohertz (1 KHz), for example.

With continuing reference to FIG. 3, in a first non-limiting example, the RF signal 300 transmitted by the first remote unit 302 is in a downlink frequency range of at least one of the second remote unit 304 and the third remote unit 306 in the selected remote unit group 220. In this regard, the control circuit 202 instructs the at least one of the second remote unit 304 and the third remote unit 306 to receive the RF signal 300 in a listening mode in the downlink frequency range. In a second non-limiting example, the RF signal 300 transmitted by the first remote unit 302 is in an uplink frequency range of at least one of the second remote unit 304 and the third remote unit 306 in the selected remote unit group 220. In this regard, the control circuit 202 further instructs the at least one of the second remote unit 304 and the third remote unit 306 to receive the RF signal 300 in the listening mode in the uplink frequency range.

In another non-limiting example, the first remote unit 302 in the selected remote unit group 220 is configured to transmit the RF signal 330 that includes a plurality of non-coherent frequencies corresponding to a plurality of assigned weight factors, respectively. The non-coherent frequencies, which provide frequency diversity, can help neutralize selective fading effects that are typically frequency dependent. In this regard, the second remote unit 304 in the selected remote unit group 220 is configured to receive the RF signal 300 in the non-coherent frequencies. The second remote unit 304 is further configured to determine the first power prediction deviation $\Delta_{@B}$ based on the assigned weight factors corresponding to the non-coherent frequencies. Likewise, the third remote unit 306 in the selected remote unit group 220 is configured to receive the RF signal 300 in the non-coherent frequencies. The third remote unit 306 is further configured to determine the second power prediction deviation $\Delta_{@C}$ based on the assigned weight factors corresponding to the non-coherent frequencies.

Figure 6:
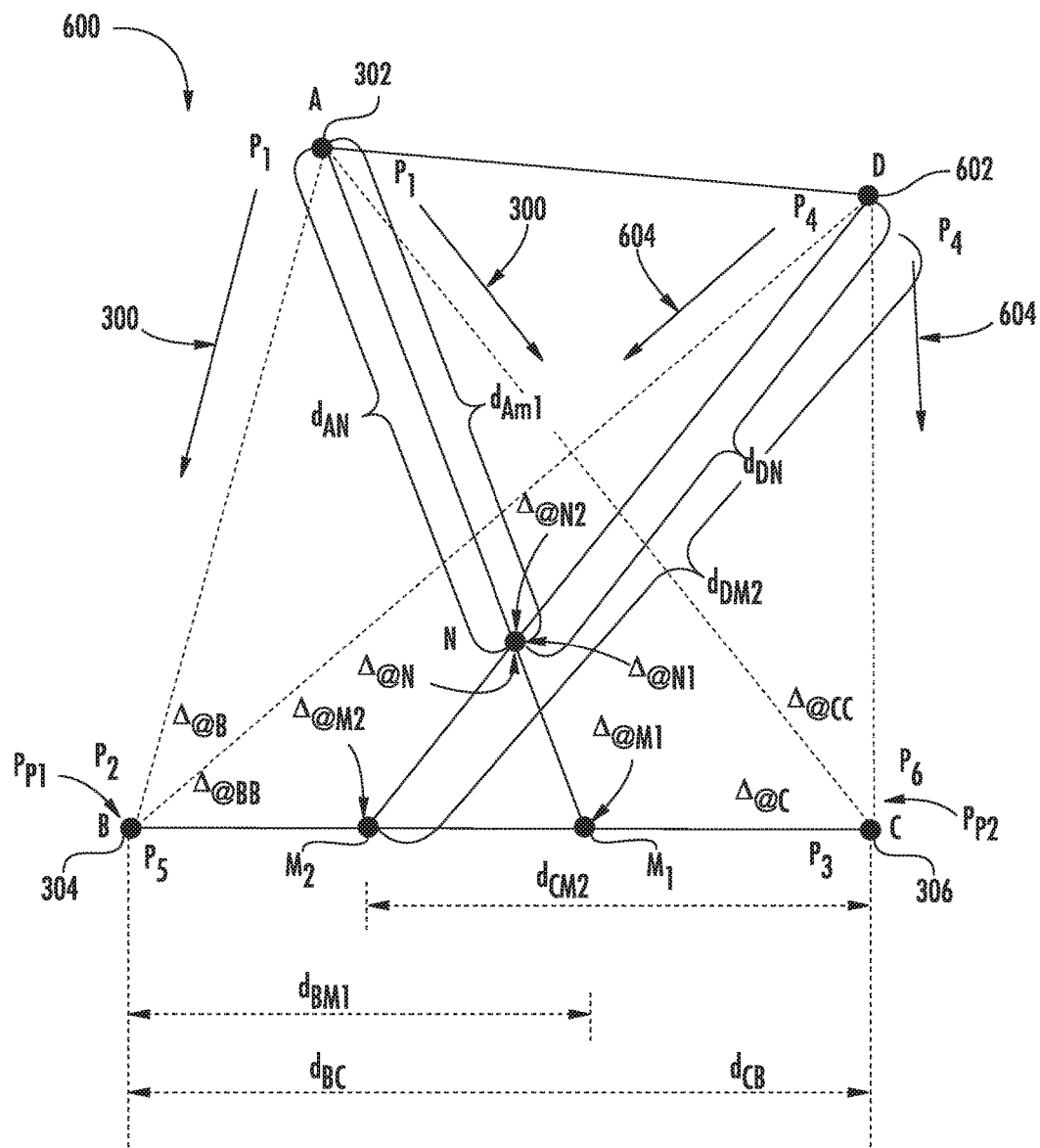
FIG. 6 is a schematic diagram of an exemplary selected remote unit group including the three remote units of FIG. 3 and a fourth remote unit for determining correction factors with enhanced accuracy.

According to Eq. 2, the control circuit 202 determines the correction factor $\Delta_{@L}$ in the selected remote unit group 220 based on the correction factor $\Delta_{@1}$, which is further determined based on Eq. 1. In a non-limiting example, it is possible to enhance and/or verify accuracy of the correction factor $\Delta_{@L}$ determined based on Eq. 2 by determining multiple versions of the correction factor $\Delta_{@L}$. In this regard, FIG. 6 is a schematic diagram of an exemplary second selected remote unit group 600 including the first remote unit 302 of FIG. 3, the second remote unit 304 of FIG. 3, the third remote unit 306 of FIG. 3, and a fourth remote unit 602 for determining at least one correction factor $\Delta_{@N}$ with enhanced accuracy. Common elements between FIGS. 3 and 6 are shown therein with common element numbers and will not be re-described herein.

With reference to FIG. 6, the control circuit 202 instructs the first remote unit 302 to transmit the RF signal 300 at the first actual power level $P_1$. The control circuit 202 instructs the second remote unit 304 to receive the RF signal 300 at the second actual power level $P_2$. The control circuit 202 determines the first power prediction deviation $\Delta_{@B}$ at the second remote unit 304 based on the difference between the received second actual power level $P_2$ and the first predicted receiving power level $P_{P1}$.

The control circuit 202 instructs the third remote unit 306 to receive the RF signal 300 at the third actual power level $P_3$. The control circuit 202 determines the second power prediction deviation $\Delta_{@C}$ at the third remote unit 306 based on the difference between the received third actual power level $P_3$ and the second predicted receiving power level $P_{P2}$.

With continuing reference to FIG. 6, the control circuit 202 instructs the fourth remote unit 602 (also referenced as point D) to transmit at least one second RF signal 604 at a fourth actual power level $P_4$. The control circuit 202 instructs the second remote unit 304 to receive the second RF signal 604 at a fifth actual power level $P_5$. The control circuit 202 determines a third power prediction deviation $\Delta_{@BB}$ based on the difference between the received fifth actual power level $P_5$ and the first predicted receiving power level $P_{P1}$.

The control circuit 202 instructs the third remote unit 306 to receive the second RF signal 604 at a sixth actual power level $P_6$. The control circuit 202 determines a fourth power prediction deviation $\Delta_{@CC}$ based on the difference between the received sixth actual power level $P_6$ and the second predicted receiving power level $P_{P2}$.

Accordingly, the control circuit 202 determines the at least one correction factor $\Delta_{@N}$ among the correction factors $\Delta_{@1}$-$\Delta_{@L}$ of FIG. 3 based on the first power prediction deviation $\Delta_{@B}$, the second power prediction deviation $\Delta_{@C}$, the third power prediction deviation $\Delta_{@BB}$, and the fourth power prediction deviation $\Delta_{@CC}$. Specifically, the control circuit 202 first determines a first correction factor $\Delta_{@M1}$ based on the equation (Eq. 7) below.

$$\Delta_{@M1} = (d_{BM1}/d_{BC}) \times (A_{@C} - \Delta_{@B}) + \Delta_{@B} \qquad \text{(Eq. 7)}$$

With reference to Eq. 7, $d_{BM1}$ refers to a linear distance from point B to point M1, and $d_{BC}$ refers to the linear distance from point B to point C. The control circuit 202 is configured to determine a first reference correction factor $\Delta_{@N1}$ based on the equation (Eq. 8) below.

$$\Delta_{@N1}=(d_{AN}/d_{AM1})\times\Delta_{@M1} \qquad (Eq.\ 8)$$

With reference to Eq. 8, $d_{AN}$ refers to the linear distance from point A to point N, and $d_{AM1}$ refers to a linear distance from point A to point M1. Next, the control circuit 202 determines a second correction factor $\Delta_{@M2}$ based on the equation (Eq. 9) below.

$$\Delta_{@M2}=(d_{CM2}/d_{CB})\times(A_{@BB}-\Delta_{@CC})+\Delta_{@CC} \qquad (Eq.\ 9)$$

With reference to Eq. 9, $d_{CM2}$ refers to a linear distance from point C to point M2, and $d_{C3}$ refers to a linear distance from point C to point B. The control circuit 202 is configured to determine a second reference correction factor $\Delta_{@N2}$ based on the equation (Eq. 10) below.

$$\Delta_{@N2}=(d_{DN}/d_{DM2})\times\Delta_{@M2} \qquad (Eq.\ 10)$$

With reference to Eq. 10, $d_{DN}$ refers to a linear distance from point D to point N and $d_{DM2}$ refers to a linear distance from point D to point M2. As such, the control circuit 202 can determine the correction factor $\Delta_{@N}$ based on the first reference correction factor $\Delta_{@N1}$ and the second reference correction factor $\Delta_{@N2}$, thus improving accuracy of the correction factor $\Delta_{@N}$. In a non-limiting example, the control circuit 202 can determine the correction factor $\Delta_{@N}$ by averaging the first and section reference correction factors $\Delta_{@N1}$ and $\Delta_{@N2}$.

With reference back to FIG. 3, in a non-limiting example, the first remote unit 302, the second remote unit 304, and the third remote unit 306 are mounted on a same ceiling of a building. In this regard, the first remote unit 302, the second remote unit 304, and the third remote unit 306 in the selected remote unit group 220 are located at a first height from a ground level (e.g., a floor in the building). In this regard, according to the same non-limiting example, the selected correction points 310(1)-310(L) are also located approximately at the first height from the ground level.

Figure 7:
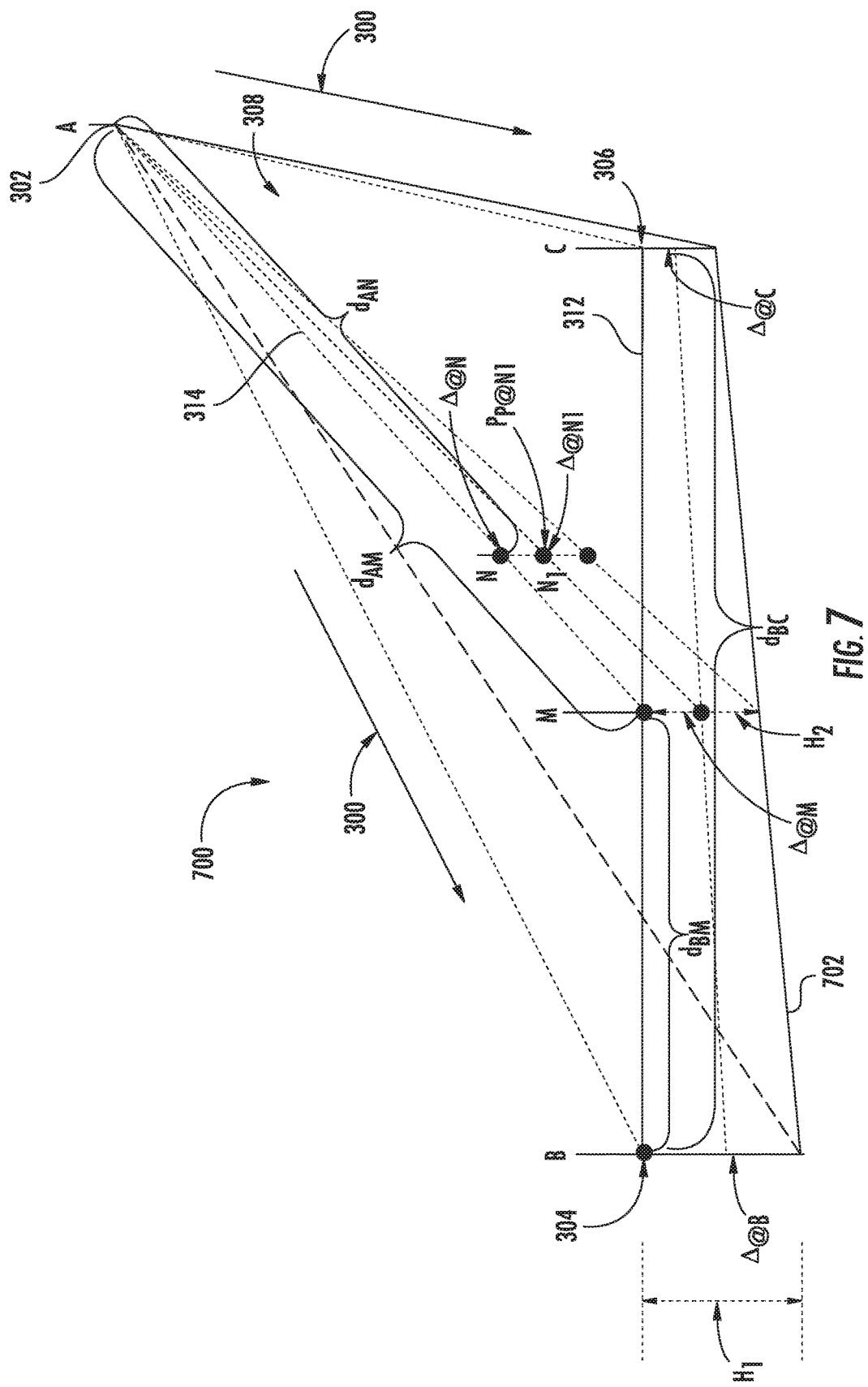
FIG. 7 is a schematic diagram of an exemplary selected remote unit group configured to determine a correction factor for a selected correction point located at a lower height than the three remote units in the selected remote unit group of FIG. 3.

However, it may be possible that a selected correction point (e.g., a client device) among the selected correction points 310(1)-310(L) is located at a second height from the ground level, and the second height is lower than the first height. In this regard, FIG. 7 is a schematic diagram of an exemplary selected remote unit group 700 configured to determine a correction factor $\Delta_{@N1}$ for a selected correction point N1 located at a lower height than the first remote unit 302, the second remote unit 304, and the third remote unit 306 in the selected remote unit group 220 of FIG. 3. Common elements between FIGS. 3 and 6 are shown therein with common element numbers and will not be re-described herein.

With reference to FIG. 7, the first remote unit 302, the second remote unit 304, and the third remote unit 306 are located at a first height $H_1$ from a ground level 702. However, the selected correction point N1 is located at a second height $H_2$ from the ground level 702, and the second height $H_2$ is lower than the first height $H_1$. In a non-limiting example, the selected correction point N1 is a client device held by a user. The selected correction point N1 has a predicted power level $P_{P@N1}$, which is generated via calculation and/or simulation. To determine a correction factor $\Delta_{@N1}$, the control circuit 202 is configured to first determine the correction factor $\Delta_{@M}$ based on Eq. 1 discussed above. Next, the control circuit 202 is configured to determine a correction factor $\Delta_{@N}$ based on Eq. 2 discussed above. The control circuit 202 is further configured to determine the correction factor $\Delta_{@N1}$ for the selected correction point N1 based on the equation (Eq. 11) below. As such, the correction factor $\Delta_{@N1}$ can be used to improve RF performance for client devices located within the area 308.

$$\Delta_{@N1}=P_{P@N1}-\Delta_{@N} \qquad (Eq.\ 11)$$

With reference back to FIG. 2, the central unit 208 is communicatively coupled to one or more signal sources 222(1)-222(K). In a non-limiting example, the signal sources 222(1)-222(K) are digital baseband units (BBUs) and/or base transceiver stations (BTSs). The signal sources 222(1)-222(K) are configured to communicate with the central unit 208 based on communication protocols, such as common public radio interface (CPRI), open base station architecture initiative (OBSAI) protocol, open radio equipment interface (ORI) protocol, or proprietary communication protocols.

Figure 8:
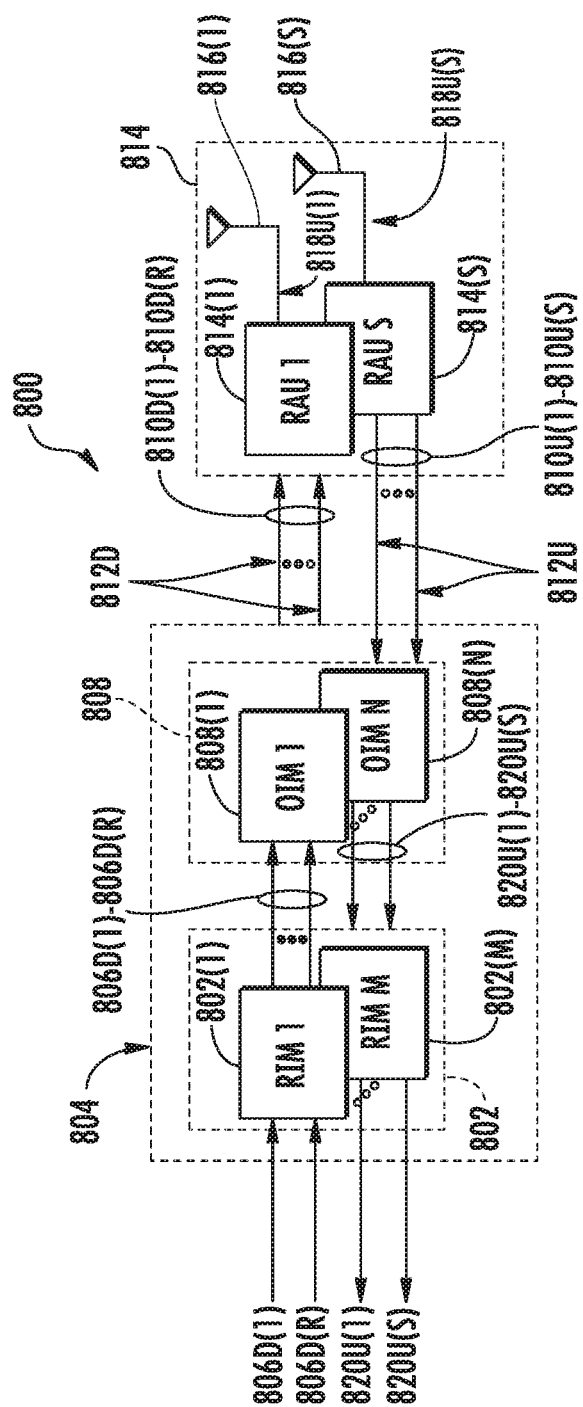
FIG. 8 is a schematic diagram of an exemplary optical fiber-based WDS provided in the form of an optical fiber-based DAS that includes the WDS of FIG. 2 configured to optimize RF coverage in the remote unit coverage areas.

FIG. 8 is a schematic diagram of an exemplary optical fiber-based WDS 800 provided in the form of an optical fiber-based DAS that includes the WDS 200 of FIG. 2 configured to optimize RF coverage in the remote unit coverage areas 204(1)-204(N). The WDS 800 includes an optical fiber for distributing communications services for multiple frequency bands. The WDS 800 in this example is comprised of three main components. One or more radio interfaces provided in the form of radio interface modules (RIMS) 802(1)-802(M) are provided in a central unit 804 to receive and process downlink electrical communications signals 806D(1)-806D(R) prior to optical conversion into downlink optical fiber-based communications signals. The downlink electrical communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve RIMs 802(1)-802(12). Each RIM 802(1)-802(M) can be designed to support a particular type of radio source or range of radio sources (i.e., frequencies) to provide flexibility in configuring the central unit 804 and the WDS 800 to support the desired radio sources.

For example, one RIM 802 may be configured to support the PCS radio band. Another RIM 802 may be configured to support the 800 megahertz (MHz) radio band. In this example, by inclusion of these RIMs 802, the central unit 804 could be configured to support and distribute communications signals on both PCS and LTE 700 radio bands, as an example. The RIMs 802 may be provided in the central unit 804 that support any frequency bands desired, including but not limited to the US Cellular band, PCS band, AWS band, 700 MHz band, Global System for Mobile communications (GSM) 900, GSM 1800, and Universal Mobile Telecommunications System (UMTS). The RIMs 802(1)-802(M) may also be provided in the central unit 804 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink electrical communications signals 806D(1)-806D(R) are provided to a plurality of optical interfaces provided in the form of optical interface modules (OIMs) 808(1)-808(N) in this embodiment to convert the downlink electrical communications signals 806D(1)-806D(R) into downlink optical fiber-based communications signals 810D(1)-810D(R). The notation "1-N" indicates that any number of the referenced component 1-N may be provided. The OIMs 808(1)-808(N) may be configured to provide one or more optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink electrical communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote antenna units (RAUs) 814(1)-814(S). The notation "1-S" indicates that any number of the referenced component 1-S may be provided. O/E converters provided in the RAUs 814(1)-814(S) convert the downlink optical fiber-based communications signals 810D(1)-810D(R) back into the downlink electrical communications signals 806D(1)-806D(R), which are provided to antennas 816(1)-816(S) in the RAUs 814(1)-814(S) to client devices in the reception range of the antennas 816(1)-816(S).

E/O converters are also provided in the RAUs 814(1)-814(S) to convert uplink electrical communications signals 818U(1)-818U(S) received from client devices through the antennas 816(1)-816(S) into uplink optical fiber-based communications signals 810U(1)-810U(S). The RAUs 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into uplink electrical communications signals 820U(1)-820U(S), which are processed by the RIMS 802(1)-802(M) and provided as uplink electrical communications signals 820U(1)-820U(S). The central unit 804 may provide the uplink electrical communications signals 820U(1)-820U(S) to a base station or other communications system.

Note that the downlink optical fiber-based communications medium 812D and the uplink optical fiber-based communications medium 812U connected to each RAU 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium.

Figure 9:
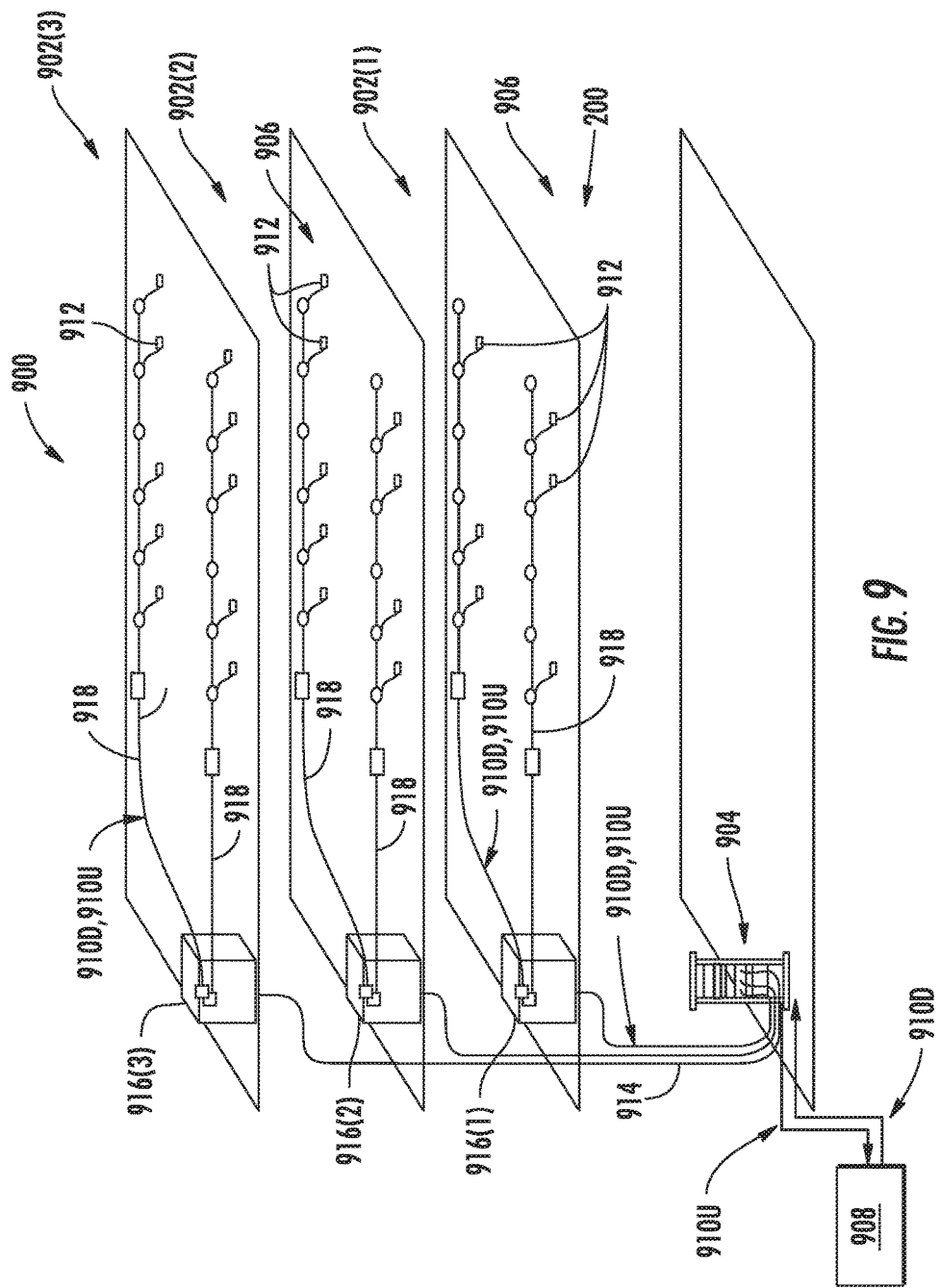
FIG. 9 is a partial schematic cut-away diagram of an exemplary building infrastructure in which the WDS of FIG. 2 can be provided.

The WDS 200 of FIG. 2 may be provided in an indoor environment, as illustrated in FIG. 9. FIG. 9 is a partial schematic cut-away diagram of an exemplary building infrastructure 900 in which the WDS 200 of FIG. 2 can be employed. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904, and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
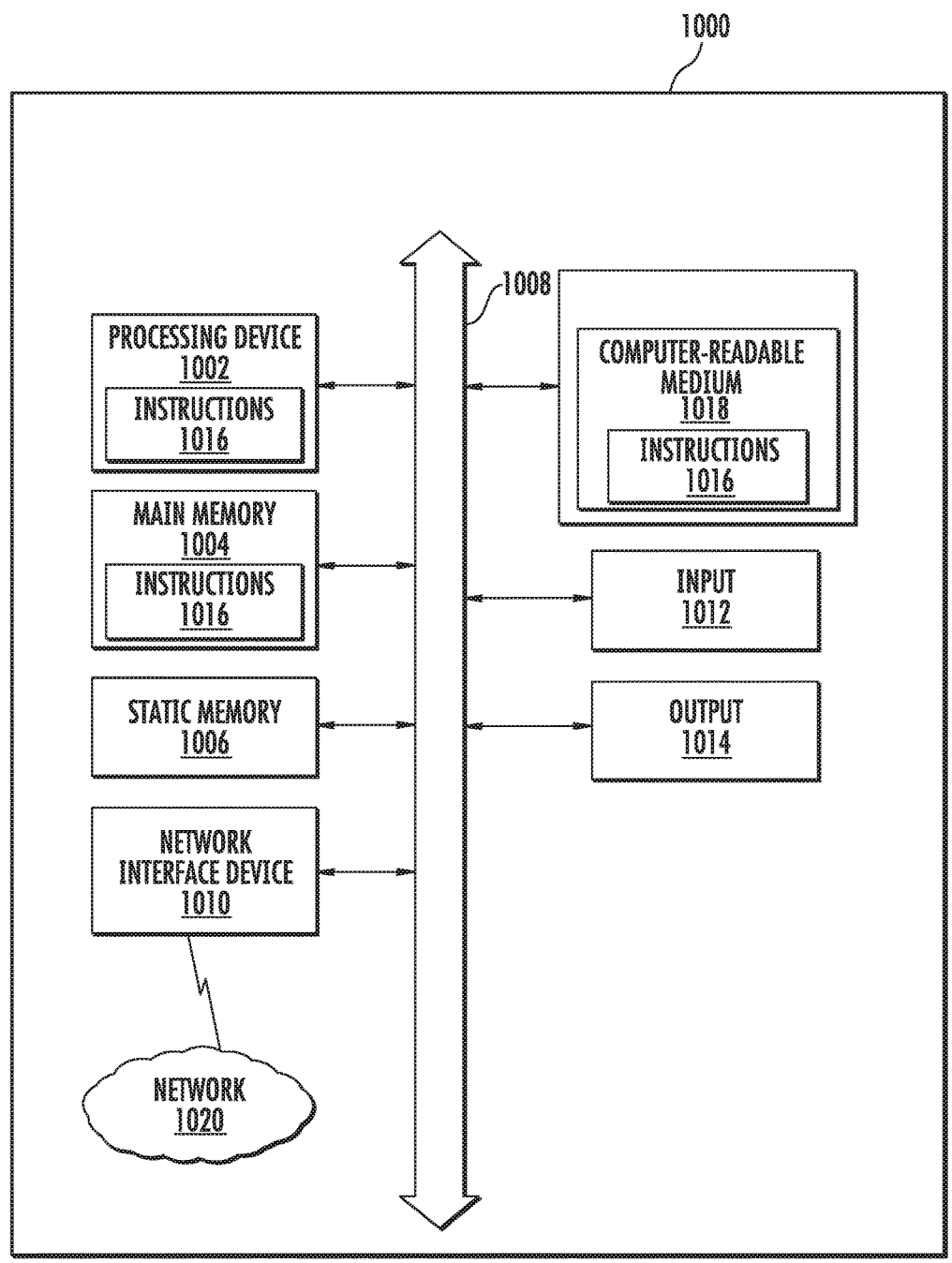
FIG. 10 is a schematic diagram representation of additional detail illustrating an exemplary computer system that could be employed in a control circuit(s) in the WDS of FIG. 2 for optimizing RF coverage in the remote unit coverage areas.

FIG. 10 is a schematic diagram representation of additional detail illustrating an exemplary computer system 1000 that could be employed in a control circuit, including the control circuit 202 of FIG. 2, for optimizing RF coverage in the remote unit coverage areas 204(1)-204(N) in the WDS 200 of FIG. 2. In this regard, the computer system 1000 is adapted to execute instructions from an exemplary computer-readable medium to perform these and/or any of the functions or processing described herein.

In this regard, the computer system 1000 in FIG. 10 may include a set of instructions that may be executed to predict frequency interference to avoid or reduce interference in a multi-frequency DAS. The computer system 1000 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1000 in this embodiment includes a processing device or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processor 1002 may be connected to the main memory 1004 and/or the static memory 1006 directly or via some other connectivity means. The processor 1002 may be a controller, and the main memory 1004 or the static memory 1006 may be any type of memory.

The processor 1002 represents one or more general-purpose processing devices, such as a microprocessor, central processing unit, or the like. More particularly, the processor 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1002 is configured to execute processing logic in instructions for performing the operations and steps discussed herein.

The computer system 1000 may further include a network interface device 1010. The computer system 1000 also may or may not include an input 1012, configured to receive input and selections to be communicated to the computer system 1000 when executing instructions. The computer system 1000 also may or may not include an output 1014, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1000 may or may not include a data storage device that includes instructions 1016 stored in a computer-readable medium 1018. The instructions 1016 may also reside, completely or at least partially, within the main memory 1004 and/or within the processor 1002 during execution thereof by the computer system 1000, the main memory 1004 and the processor 1002 also constituting computer-readable medium. The instructions 1016 may further be transmitted or received over a network 1020 via the network interface device 1010.

While the computer-readable medium 1018 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for optimizing radio frequency (RF) coverage in remote unit coverage areas in a wireless distribution system (WDS), comprising:
   for at least one selected remote unit group comprising two or more remote units among a plurality of remote units in the WDS:
   instructing a first remote unit in the at least one selected remote unit group to transmit at least one RF signal;
   instructing a second remote unit in the at least one selected remote unit group to receive the at least one RF signal;
   determining a first prediction deviation at the second remote unit based on a difference between the at least one RF signal received at the second remote unit and the at least one RF signal predicted to be received at the second remote unit;
   instructing a third remote unit in the at least one selected remote unit group to receive the at least one RF signal;
   determining a second prediction deviation at the third remote unit based on a difference between the at least one RF signal received at the third remote unit and the at least one RF signal predicted to be received at the third remote unit; and
   determining one or more correction factors for one or more selected correction points located within an area defined by the at least one selected remote unit group based on the first prediction deviation and the second prediction deviation.

2. The method of claim 1, further comprising:
   for the at least one selected remote unit group comprising two or more remote units among the plurality of remote units:
   instructing the first remote unit in the at least one selected remote unit group to transmit the at least one RF signal at a first actual power level;
   instructing the second remote unit in the at least one selected remote unit group to receive the at least one RF signal at a second actual power level;
   determining a first power prediction deviation at the second remote unit based on a difference between the received second actual power level and a first predicted receiving power level at the second remote unit;

instructing the third remote unit in the at least one selected remote unit group to receive the at least one RF signal at a third actual power level;

determining a second power prediction deviation at the third remote unit based on a difference between the received third actual power level and a second predicted receiving power level at the third remote unit; and determining one or more power correction factors for the one or more selected correction points located within the area defined by the at least one selected remote unit group based on the first power prediction deviation and the second power prediction deviation.

3. The method of claim 2, further comprising adjusting actual power level of the at least one RF signal based on the determined one or more correction factors.

4. The method of claim 2, further comprising:
determining a first actual path loss at the second remote unit based on the received second actual power level and the transmitted first actual power level;
determining a first path loss prediction deviation based on a difference between the determined first actual path loss and a first predicted path loss at the second remote unit;
determining a second actual path loss at the third remote unit based on the received third actual power level and the transmitted first actual power level;
determining a second path loss prediction deviation based on a difference between the determined second actual path loss and a second predicted path loss at the third remote unit; and
determining one or more path loss correction factors for the one or more selected correction points based on the determined first path loss prediction deviation and the determined second path loss prediction deviation.

5. The method of claim 4, further comprising:
determining that actual path losses are higher than predicted path losses at the one or more selected correction points based on the one or more path loss correction factors; and
controlling the first remote unit in the at least one selected remote unit group to increase the first actual power level of the at least one RF signal in response to determining that the actual path losses are higher than the predicted path losses at the one or more selected correction points.

6. The method of claim 4, further comprising:
determining that actual path losses are lower than predicted path losses at the one or more selected correction points based on the one or more path loss correction factors; and
controlling the first remote unit in the at least one selected remote unit group to decrease the first actual power level of the at least one RF signal in response to determining that the actual path losses are lower than the predicted path losses at the one or more selected correction points.

7. The method of claim 4, further comprising:
determining that actual path losses are equal to predicted path losses at the one or more selected correction points based on the one or more path loss correction factors; and
controlling the first remote unit in the at least one selected remote unit group to maintain the first actual power level of the at least one RF signal in response to determining that the actual path losses are equal to the predicted path losses at the one or more selected correction points.

8. The method of claim 2, further comprising determining one or more power correction factors for the one or more selected correction points based on the determined first power prediction deviation and the determined second power prediction deviation.

9. The method of claim 8, further comprising:
determining that actual power levels are higher than predicted receiving power levels at the one or more selected correction points based on the one or more power correction factors; and
controlling the first remote unit in the at least one selected remote unit group to decrease the first actual power level of the at least one RF signal in response to determining that the actual power levels are higher than the predicted receiving power levels at the one or more selected correction points.

10. The method of claim 8, further comprising:
determining that actual power levels are lower than predicted receiving power levels at the one or more selected correction points based on the one or more power correction factors; and
controlling the first remote unit in the at least one selected remote unit group to increase the first actual power level of the at least one RF signal in response to determining that the actual power levels are lower than the predicted receiving power levels at the one or more selected correction points.

11. The method of claim 8, further comprising:
determining that actual power levels are equal to predicted receiving power levels at the one or more selected correction points based on the one or more power correction factors; and
controlling the first remote unit in the at least one selected remote unit group to maintain the first actual power level of the at least one RF signal in response to determining that the actual power levels are equal to the predicted receiving power levels at the one or more selected correction points.

12. The method of claim 2, further comprising configuring the first remote unit in the at least one selected remote unit group to transmit the at least one RF signal comprising at least one non-modulated continuous wave signal.

13. The method of claim 12, further comprising configuring the second remote unit and the third remote unit to receive the at least one non-modulated continuous wave signal at a defined RF filter bandwidth.

14. The method of claim 2, further comprising:
instructing the first remote unit to transmit the at least one RF signal in a downlink frequency range of at least one of the second remote unit and the third remote unit in the at least one selected remote unit group; and
instructing the at least one of the second remote unit and the third remote unit to receive the at least one RF signal in a listening mode in the downlink frequency range.

15. The method of claim 2, further comprising:
instructing the first remote unit to transmit the at least one RF signal in an uplink frequency range of at least one of the second remote unit and the third remote unit in the at least one selected remote unit group; and
instructing the at least one of the second remote unit and the third remote unit to receive the at least one RF signal in a listening mode in the uplink frequency range.

16. The method of claim 2, further comprising configuring the first remote unit to transmit the at least one RF signal to the second remote unit and the third remote unit in the at least one selected remote unit group concurrently.

17. The method of claim 16, further comprising determining the first power prediction deviation by subtracting the first predicted receiving power level from the second actual power level.

18. The method of claim 16, further comprising determining the second power prediction deviation by subtracting the second predicted receiving power level from the third actual power level.

19. The method of claim 2, further comprising transmitting the at least one RF signal that comprises a plurality of non-coherent frequencies corresponding to a plurality of assigned weight factors, respectively.

20. The method of claim 19, further comprising:
receiving the at least one RF signal by the second remote unit in the plurality of non-coherent frequencies; and
determining the first power prediction deviation based on the plurality of assigned weight factors corresponding to the plurality of non-coherent frequencies.

21. The method of claim 19, further comprising:
receiving the at least one RF signal by the third remote unit in the plurality of non-coherent frequencies; and
determining the second power prediction deviation based on the plurality of assigned weight factors corresponding to the plurality of non-coherent frequencies.

22. The method of claim 2, further comprising locating the first remote unit, the second remote unit, and the third remote unit in the at least one selected remote unit group at a first height from a ground level.

23. The method of claim 22, further comprising determining a correction factor for a selected correction point located at a second height lower than the first height based on the first power prediction deviation and the second power prediction deviation.

* * * * *